United States Patent
Nishikawa et al.

(10) Patent No.: US 8,203,753 B2
(45) Date of Patent: Jun. 19, 2012

(54) IMAGE PROCESSING APPARATUS AND METHOD THEREFOR

(75) Inventors: Hiromitsu Nishikawa, Tokyo (JP); Masaomi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 12/138,829

(22) Filed: Jun. 13, 2008

(65) Prior Publication Data

US 2008/0316512 A1    Dec. 25, 2008

(30) Foreign Application Priority Data

Jun. 13, 2007    (JP) ................. 2007-156736

(51) Int. Cl.
G06K 1/00 (2006.01)
G06K 15/02 (2006.01)
G06K 9/00 (2006.01)

(52) U.S. Cl. .......... 358/1.9; 358/1.2; 382/162; 382/165; 382/167

(58) Field of Classification Search ................... 358/1.9, 358/1.2, 300, 521, 504, 520, 518, 530; 382/162, 382/165, 167; 347/12, 15, 19, 42; 399/49, 399/72
See application file for complete search history.

(56) References Cited

U.S. PATENT DOCUMENTS

2005/0007609 A1* 1/2005 Itagaki et al. ................. 358/1.9

FOREIGN PATENT DOCUMENTS

JP    2006-030422 A    2/2006

* cited by examiner

*Primary Examiner* — Charlotte M Baker
(74) *Attorney, Agent, or Firm* — Canon USA, Inc., IP Division

(57) ABSTRACT

An image processing apparatus sets a print parameter with which stability of colors can be achieved in continuous printing. The number of prints is obtained. The print parameter is adjusted, and stability of colors in the case where the number of prints are printed in a continuous manner is evaluated. Based on the evaluation result, the print parameter is set.

7 Claims, 5 Drawing Sheets

IMAGE PROCESSING APPARATUS AND METHOD THEREFOR

BACKGROUND OF THE INVENTION

1. Field of the Invention

The present invention relates to image processing apparatuses and methods therefor.

2. Description of the Related Art

One of the problems with color printers is that colors change from page to page due to mechanical variations or the like when the same image is printed many times in a continuous manner (hereinafter referred to as "continuous printing").

In order to reduce changes in colors, for example, Japanese Patent Laid-Open No. 2006-030422 discloses the technique of monitoring the state of a printer engine currently performing continuous printing and, when a change in color occurs, immediately suspending the continuous printing and performing a calibration operation. With this technique, colors in continuous printing become stable.

However, the foregoing technique requires suspension of the continuous printing. Together with a time involved in the calibration operation, the foregoing technique requires a long time to complete printing. Since calibration is periodically performed, there may be a local increase in color difference from page to page.

SUMMARY OF THE INVENTION

The present invention provides a structure configured to set a print parameter with which colors in continuous printing become stable.

Image processing according to an aspect of the present invention includes the following: obtaining information indicating a number of prints; adjusting a print parameter; evaluating stability of colors in a case where the number of prints are printed in a continuous manner; and setting the print parameter based on a result of the evaluation.

Further features of the present invention will become apparent from the following description of exemplary embodiments with reference to the attached drawings.

DESCRIPTION OF THE EMBODIMENTS

Image processing according to exemplary embodiments of the present invention will now herein be described in detail with reference to the drawings.

System Configuration

Figure 1:
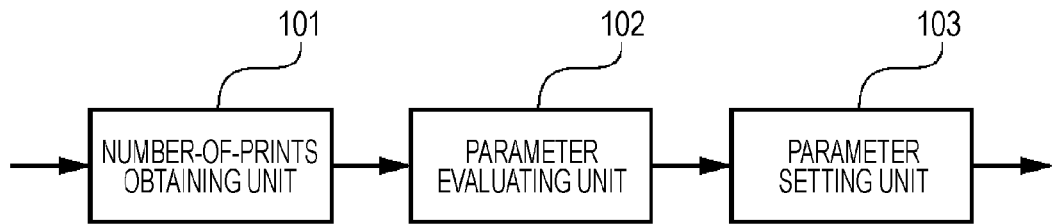
FIG. 1 is a block diagram of an exemplary functional configuration of an image processing system according to an embodiment of the present invention.

FIG. 1 is a block diagram of an exemplary functional configuration of an image processing system according to an embodiment of the present invention.

A number-of-prints obtaining unit 101 obtains information indicating the number of prints. A parameter evaluating unit 102 performs print parameter evaluation based on the number of prints, which is obtained by the number-of-prints obtaining unit 101, so that a print parameter for improving stability throughout the entirety of a print job can be selected. A parameter setting unit 103 sets the print parameter based on the evaluation result obtained by the parameter evaluating unit 102.

Figure 2:
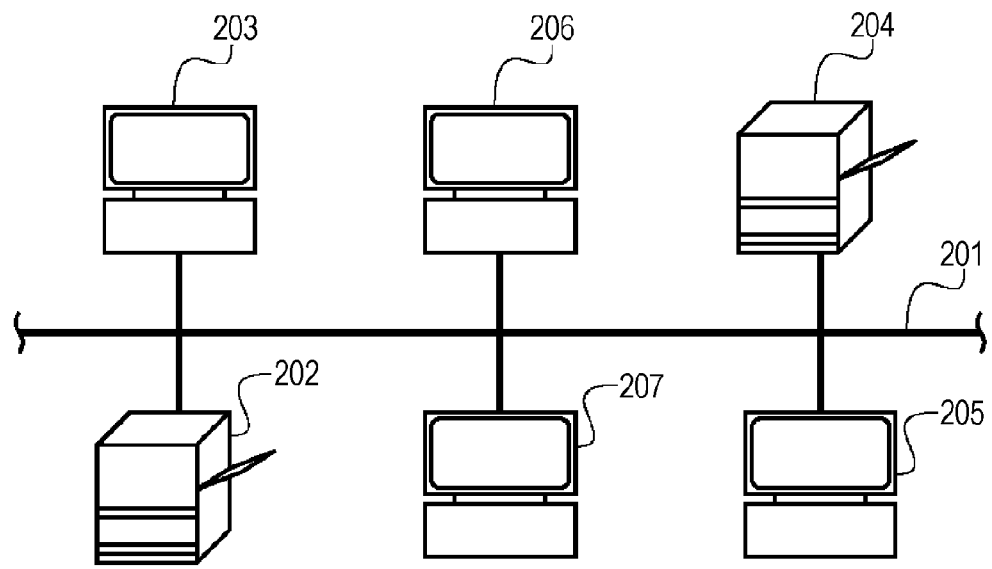
FIG. 2 is a diagram of exemplary hardware connections in the image processing system.

FIG. 2 is a diagram of exemplary hardware connections in the image processing system.

The image processing system includes printers 202 and 204 connected to a network 201. A printer controller 203 controls the printer 202 via the network 201. A printer controller 205 controls the printer 204 via the network 201. Client computers 206 and 207 are connected to the network 201.

The numbers of the printers, printer controllers, and client computers shown in FIG. 2 are only exemplary, and the printers, printer controllers, and client computers shown in FIG. 2 are not limited in number. The printers can be operated using either of the printer controllers and the client computers. Further, the client computers can also serve as the printer controllers.

Figure 3:
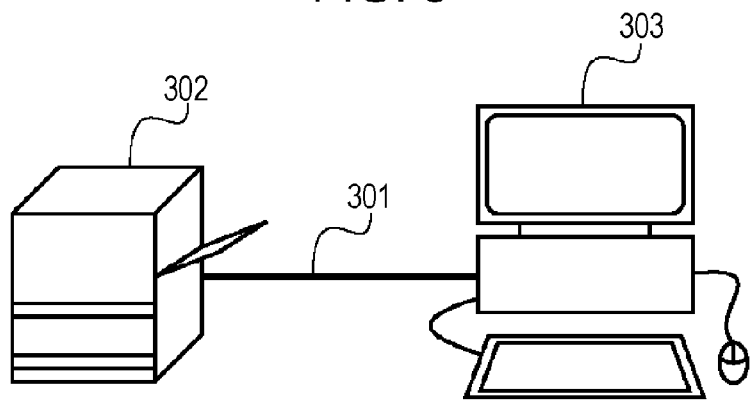
FIG. 3 is a diagram of an exemplary minimum structure of the image processing system in the case where a client computer also serves as a printer controller.

FIG. 3 is a diagram of an exemplary minimum structure of the image processing system in the case where a client computer also serves as a printer controller. Referring to FIG. 3, a printer 302 and a client computer 303 are connected to each other via a communication line 301. A parallel interface such as a network, a small computer system interface (SCSI), or IEEE 1284 or a serial bus such as a universal serial bus (USB) or IEEE 1394 can be used as the communication line 301.

The flow of a process performed in the image processing system shown in FIG. 3 is described below.

Structure of Client Computer

Figure 4:
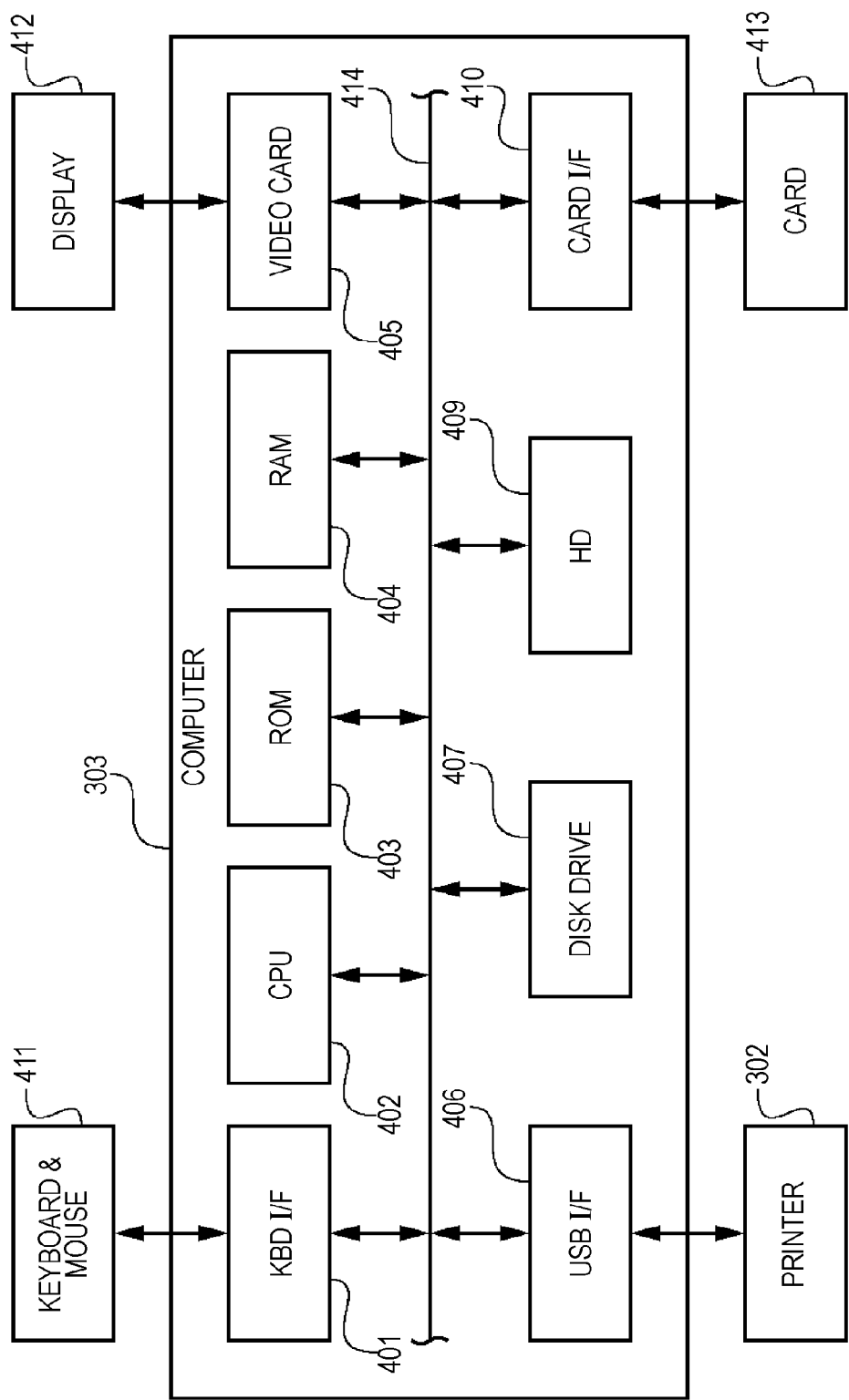
FIG. 4 is a block diagram of an exemplary structure of the client computer.

FIG. 4 is a block diagram of an exemplary structure of the client computer 303.

A central processing unit (CPU) 402 uses a random-access memory (RAM) 404 as a work memory and executes an operating system (OS) and various software programs stored in a read-only memory (ROM) 403 and a hard disk (HD) 409, for controlling other components via a system bus 414. The CPU 402 executes a printer driver that controls the printer 302 and controls a print parameter, as will be described later. The HD 409 is used to temporarily store, not only software programs, but also image data and print data.

A keyboard interface (KBD I/F) 401 is an interface that establishes a connection between a mouse and a keyboard 411 for entering a user instruction or the like and the system bus 414. A video card 405 is an interface that establishes a connection between a display 412 for displaying a UI, an image to be processed, and a processing state and the system bus 414. A USB interface 406 is an interface that establishes a connection between the printer 302 and the system bus 414.

A disk drive 407 is a drive unit for storage media including, for example, a compact disc (CD), a CD-recordable (CD-R), a CD-rewritable (CD-RW), a digital versatile disc (DVD), a DVD-R, and a DVD-RW. The disk drive 407 has the function of reading data from and writing data to a storage medium mounted thereto. When an image processing program, a printer driver, and printer information are stored in a storage medium, the CPU 402 reads the program and information from the storage medium, installs the program and information in the HD 409, and, if necessary, loads the program and information into the RAM 404.

A card interface 410 is a general interface that can connect to a card 413, such as a modem card, a network card, or a card reader/writer. The CPU 402 can transmit/receive data, via the card 413 connected to the card interface 410, to/from devices connected to the CPU 402 via telephone lines, servers provided in a network, and various storage media.

Processing

Figure 5:
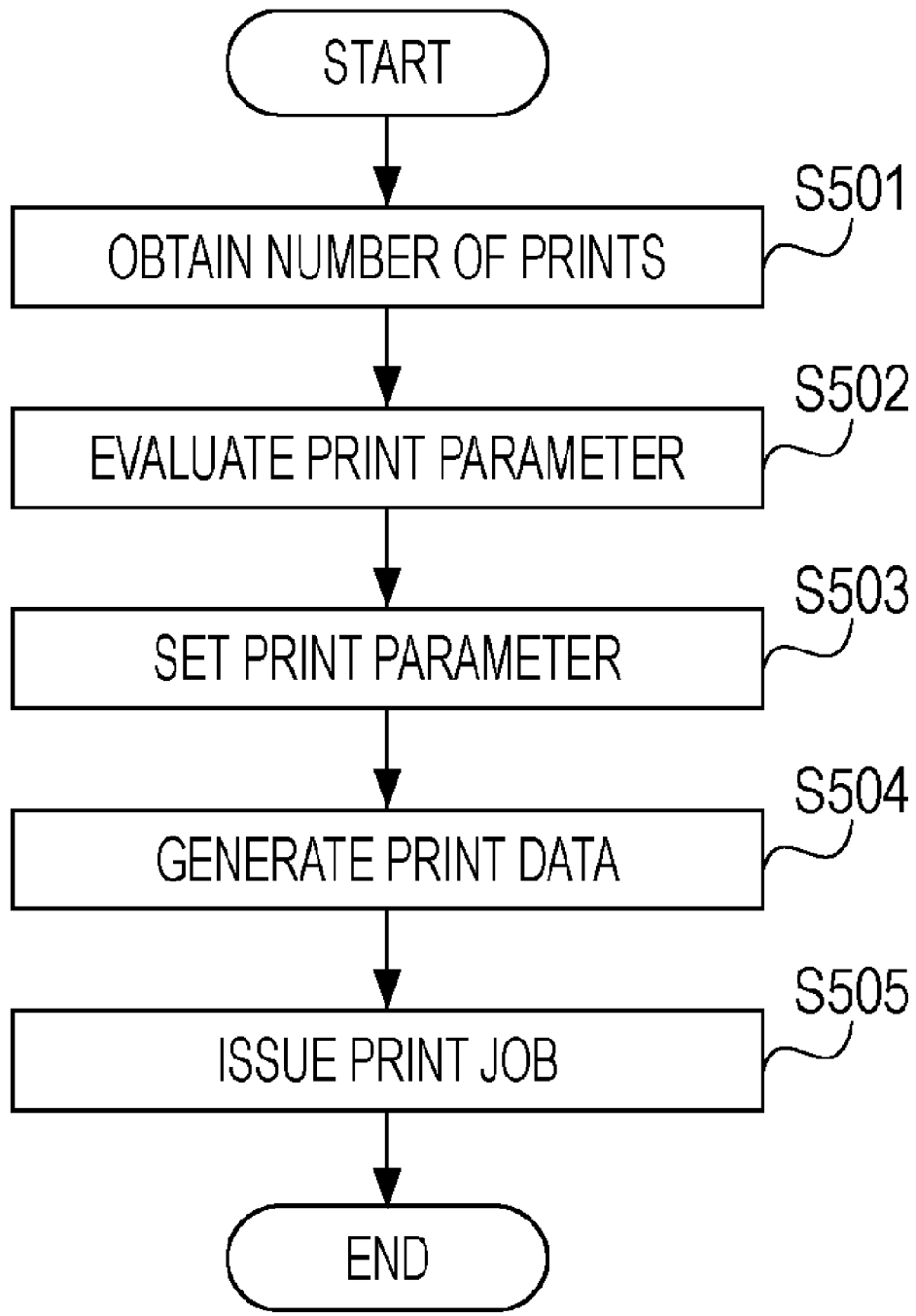
FIG. 5 is a flowchart of a process of controlling a print parameter.

FIG. 5 is a flowchart of a process of controlling a print parameter, which is performed by the CPU 402 which executes the printer driver in response to, for example, a print instruction given by a user.

Figure 7:
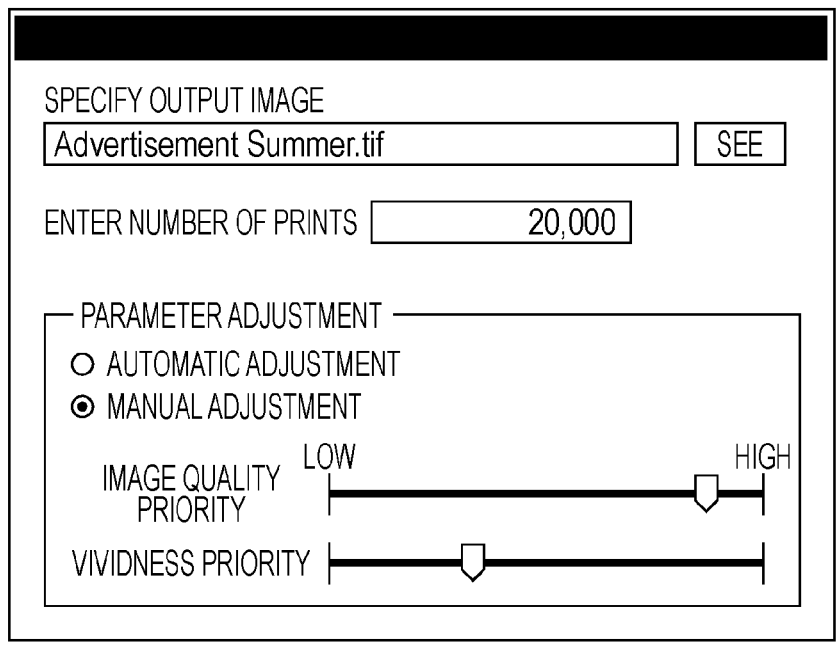
FIG. 7 illustrates an exemplary user interface (UI) displayed by a printer driver.

The CPU 402 displays, for example, a UI shown in FIG. 7 on the display 412 and obtains the number of prints of an image to be printed (S501). The user operates the UI shown in FIG. 7 and specifies an image to output. Also, the user enters the number of prints. The CPU 402 stores information indicating the number of prints N in a predetermined region of the RAM 404.

Next, the CPU 402 evaluates a print parameter with which the specified number of prints N can be printed in a stable manner (S502).

Figure 6A:
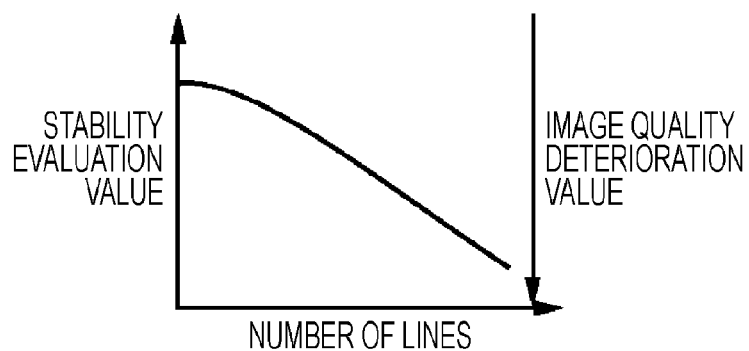
FIGS. 6A to 6C are tables each showing the relationship between a parameter adjustment amount and a stability evaluation value.
Figure 6B:
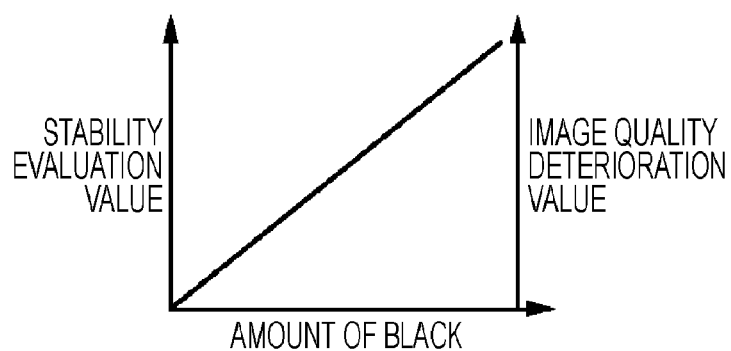
Figure 6C:
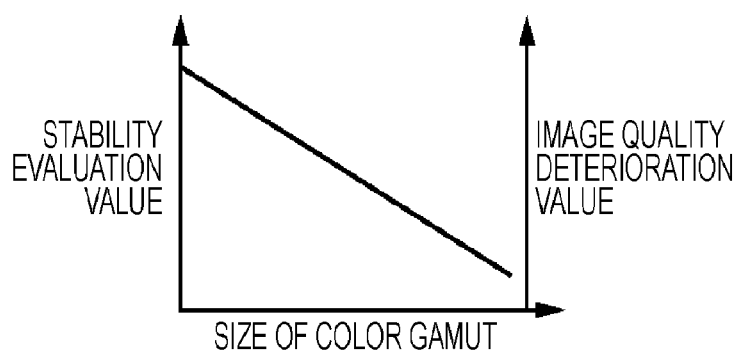

FIGS. 6A to 6C are tables which are provided as information of the printer 302 and which show the relationship between a parameter adjustment amount and a stability evaluation value. That is, FIG. 6A shows a halftone table for processing pseudo-halftones. FIG. 6B shows a color separation table. FIG. 6C shows a color adjustment table for achieving color matching. The halftone table has the number of lines as a parameter. The color separation table has the amount of black as a parameter. The color adjustment table has the size of a color gamut as a parameter.

The stability evaluation value is, for example, a value indicating the reciprocal of the amount of change in color in units of 100 prints. The amount of change in color represents, for example, an average color difference between an image printed on the first print and an image printed on the hundredth print. That is, when stability evaluation values obtained from adjustment amounts in the three tables are represented by $1/\Delta E1$, $1/\Delta E2$, and $1/\Delta E3$, if N prints are printed, a color difference $\Delta E$ between an image printed on the first print and an image printed on the N-th print is represented by equation (1):

$$\Delta E = \sqrt{(\Delta E1 \times Nn)^2 + (\Delta E2 \times Nn)^2 + (\Delta E3 \times Nn)^2} \quad (1)$$
$$= \sqrt{Nn^2 \cdot (\Delta E1^2 + \Delta E2^2 + \Delta E3^2)}$$

where $Nn = N/100$

The CPU 402 adjusts the parameter of one of the three tables, calculates the color difference $\Delta E$ in the case where the specified number of prints are printed, and, if $\Delta E$ does not exceed a predetermined target value $\Delta E$th, determines that the parameter adjustment amount is the amount with which printing can be performed in a stable manner.

However, as shown in FIGS. 6A to 6C, when the amount of black is increased, the stability is improved, but the image quality is deteriorated. When the size of a color gamut is increased, the stability is deteriorated, but the image quality is improved. That is, the stability and the image quality exhibit a trade-off relationship. Therefore, based on an image quality deterioration value provided together with the stability evaluation value, the image quality deterioration value corresponding to the adjustment amount evaluated as an adjustment amount with which printing can be performed in a stable manner is determined. If the image quality deterioration value exceeds a predetermined target value, the stability evaluation is performed again using a different table.

Image quality deterioration includes, for example, an increase in graininess, a reduction in color reproduction range, a reduction in color reproduction accuracy, a reduction in gradation, and a reduction in resolution. Tables showing the relationship between a parameter and an image quality deterioration value are provided.

When an instruction to perform a parameter automatic adjustment is given using the UI shown in FIG. 7, the CPU 402 determines a print parameter in the foregoing manner. Alternatively, a print parameter can be manually set using the UI shown in FIG. 7. After selecting "manual adjustment" using a radio button, the user can set the priority degree of image quality and the priority degree of vividness using sliders. In manual adjustment, the CPU 402 performs the foregoing stability evaluation and, when the specified number of prints cannot be printed in a stable manner, the CPU 402 gives a warning using the UI.

After the print parameter evaluation or user setting is completed, the CPU 402 stores the evaluated print parameter in the RAM 404 and sets the print parameter for performing printing (S503).

Using the set print parameter, the CPU 402 generates print data from image data to be printed (S504) and sends information indicating the specified number of prints and a print job including the print data to the printer 302 (S505), thus causing the printer 302 to perform continuous printing.

In this manner, a print parameter with which colors can be printed in a stable manner can be set according to the number of prints to be printed in a continuous manner.

Color processing according to another embodiment of the present invention is described. In the present embodiment, components that are substantially the same as those in the above-described embodiment are given the same reference numerals, and detailed descriptions thereof are not repeated to avoid redundancy.

In the above-described embodiment, the type of image to be printed is arbitrary. The print parameter with which any image can be printed a specified number of prints in a stable manner is evaluated. In contrast, in the present embodiment, after the image to be printed is analyzed, the print parameter is evaluated. Thus, the print parameter can be controlled in a more suitable manner.

Figure 8:
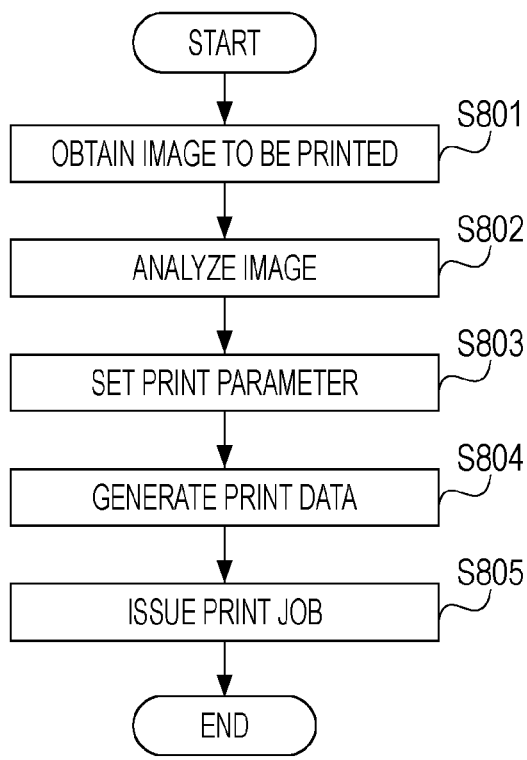
FIG. 8 is a flowchart of a process of controlling a print parameter according to an embodiment of the present invention.

FIG. 8 is a flowchart of a process of controlling a print parameter according to the present embodiment, which is performed by the CPU 402 which executes the printer driver in response to, for example, a print instruction given by a user.

The CPU 402 displays, for example, the UI shown in FIG. 7 on the display 412 and obtains image data to be printed (S801). The user operates the UI shown in FIG. 7 and specifies an image to output.

Next, the CPU 402 analyzes the obtained image data (S802). The analysis is performed to check the hue and saturation of colors included in the image data. By analyzing the image data, which region of the printer color gamut is to be used to print the image data is determined. In the following description, the color gamut of the printer to be used is referred to as the "used color gamut".

In the process from this point onward, it is only necessary to evaluate the print parameter relating to the used color gamut based on the analysis result. That is, since the size of the color gamut of the color adjustment table shown in FIG. 6C can be fixed based on the used color gamut, the print parameter can be evaluated by adjusting the number of lines in the halftone table and the amount of black in the color separation table. If sufficient image quality and stability cannot be achieved by adjusting the number of lines and the amount of black, the used color gamut may be narrowed down step by step. As a result, the print parameter that is more suitable for the image to be printed can be set.

Since the following steps S803 to S805 are the same as steps S503 to S505 of the process shown in FIG. 5 and described, detailed descriptions thereof are not repeated to avoid redundancy.

The foregoing exemplary embodiments of the present invention are applicable to a system constituted of a plurality of apparatuses including, for example, a computer, an interface device, a reader, and a printer, and to an apparatus constituted of a single apparatus, such as a copier, a facsimile machine, or a control apparatus.

The foregoing exemplary embodiments of the present invention can be achieved by supplying a storage medium recording a computer program for implementing the functions of the foregoing embodiments to a system or an apparatus and executing the computer program using a computer (CPU or microprocessing unit (MPU)) of the system or apparatus. In this case, software read from the storage medium implements the functions of the foregoing embodiments. The computer program and the computer-readable storage medium storing the computer program constitute embodiments of the present invention.

The functions are not only implemented by executing the computer program. That is, the functions may be implemented by performing part or all of actual processing using an OS running on the computer and/or first, second, and third programs in accordance with instructions of the computer program.

Further, in some cases, the computer program may be written in a memory included in a device such as a function expansion card or unit connected to a computer. That is, the functions of the foregoing embodiments may be implemented by CPUs included in first, second, and third devices which execute part or all of actual processing in accordance with instructions of the computer program.

When the embodiments of the present invention are applied to the storage medium, the storage medium stores a computer program corresponding or relating to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-156736 filed Jun. 13, 2007, which is hereby incorporated by reference herein in its entirety.

What is claimed is:

1. An image processing apparatus comprising:
    an obtaining unit configured to obtain a relationship between an adjustment amount of a print parameter and an evaluation value indicating a stability of colors;
    an obtaining unit configured to obtain information indicating a number of prints which are to be printed continuously;
    an evaluating unit, implemented using a processor, configured to evaluate stability of colors by referring the relationship in a case where the number of prints are printed in a continuous manner and to adjust the print parameter based on the number of prints; and
    a setting unit configured to set the print parameter based on an evaluation result obtained by the evaluating unit.

2. The image processing apparatus according to claim 1, wherein the evaluating unit evaluates the stability of the colors by referring to a table showing a relationship between an adjustment amount of the print parameter and an evaluation value indicating the stability of the colors.

3. The image processing apparatus according to claim 1, further comprising an analyzing unit configured to analyze a color gamut of an image to be printed and to determine a color gamut of a printer to be used,
    wherein the evaluating unit evaluates the stability of the colors with the color gamut to be used being fixed.

4. The image processing apparatus according to claim 1, wherein the print parameter indicates one of an adjustment amount in a halftone table, a color separation table, and a color adjustment table.

5. The image processing apparatus according to claim 1, wherein the evaluating unit evaluates the stability of the colors within such a range that an image quality deterioration value of a printed image does not exceed a target value.

6. An image processing method for an image processing apparatus for controlling a printer, the image processing method comprising:
    obtaining a relationship between an adjustment amount of a print parameter and an evaluation value indicating a stability of colors;
    obtaining information indicating a number of prints which are to be printed continuously;
    adjusting a print parameter;
    evaluating stability of colors by referring the relationship in a case where the number of prints are printed in a continuous manner and adjusting the print parameter based on the number of prints; and
    setting the print parameter based on a result of the evaluation.

7. A non-transitory computer-readable storage medium having computer-executable instructions stored thereon for performing the image processing method according to claim 6.

* * * * *